United States Patent [19]

Hanks et al.

[11] Patent Number: 4,624,356
[45] Date of Patent: Nov. 25, 1986

[54] FLUID PRESSURE OPERATED, AXIALLY-ENGAGING CLUTCH

[75] Inventors: James V. Hanks, Robbinsdale; Charles D. Raines, Blaine, both of Minn.

[73] Assignee: Horton Manufacturing Co., Inc., Minneapolis, Minn.

[21] Appl. No.: 715,736

[22] Filed: Mar. 25, 1985

[51] Int. Cl.[4] ............................................. F16D 25/061
[52] U.S. Cl. ............................... 192/85 CA; 192/67 R; 192/70.28
[58] Field of Search ..................... 192/67 R, 66, 70.16, 192/70.28, 85 C, 85 CA, 109 R, 110 R, 110 B

[56] References Cited

U.S. PATENT DOCUMENTS

| | | |
|---|---|---|
| 3,050,321 | 8/1962 | Howe et al. |
| 3,070,393 | 12/1962 | Silverberg et al. |
| 3,177,740 | 4/1965 | Firestone et al. |
| 3,345,886 | 10/1967 | Jennings et al. |
| 3,355,968 | 12/1967 | Sharples |
| 3,552,026 | 1/1971 | Fedoroff |
| 3,760,916 | 9/1973 | Hanks et al. ............ 192/67 R |
| 3,762,013 | 10/1973 | Irie |
| 4,262,785 | 4/1981 | Anderson et al. |

*Primary Examiner*—George H. Krizmanich
*Attorney, Agent, or Firm*—Peterson, Wicks, Nemer & Kamrath

[57] ABSTRACT

A clutch where the output always comes to the same degrees of registry with the input is shown as including coaxial drive and driven members including a hub for mounting on a drive shaft. The drive member is slidably mounted on the hub and rotatable thereby. The drive member is formed with a multiplicity of ball-receiving cavities which are located radially inward of the periphery of the drive member. The driven member includes a carrier member having a multiplicity of balls mounted thereon for engagement with the cavities. The carrier member includes a flat, radial ring portion and an inner annular flange which provides a first degree of safety by tending to prevent any dislodged balls from the carrier member from travelling inwardly between the drive and driven members and tending to allow the dislodged balls to travel radially outward of the clutch. The carrier and drive members have intermeshing interface teeth. The drive member is moved axially on the hub for engagement of the cavities thereof with the balls of the carrier member as the teeth of the drive member engage the teeth of the ball carrier to thereby rotate the driven member. In its most preferred form, a second degree of safety is provided by having the maximum interface gap between the drive and driven members greater than the diameter of the balls to prevent any dislodged balls from jamming between the drive and driven members.

21 Claims, 3 Drawing Figures

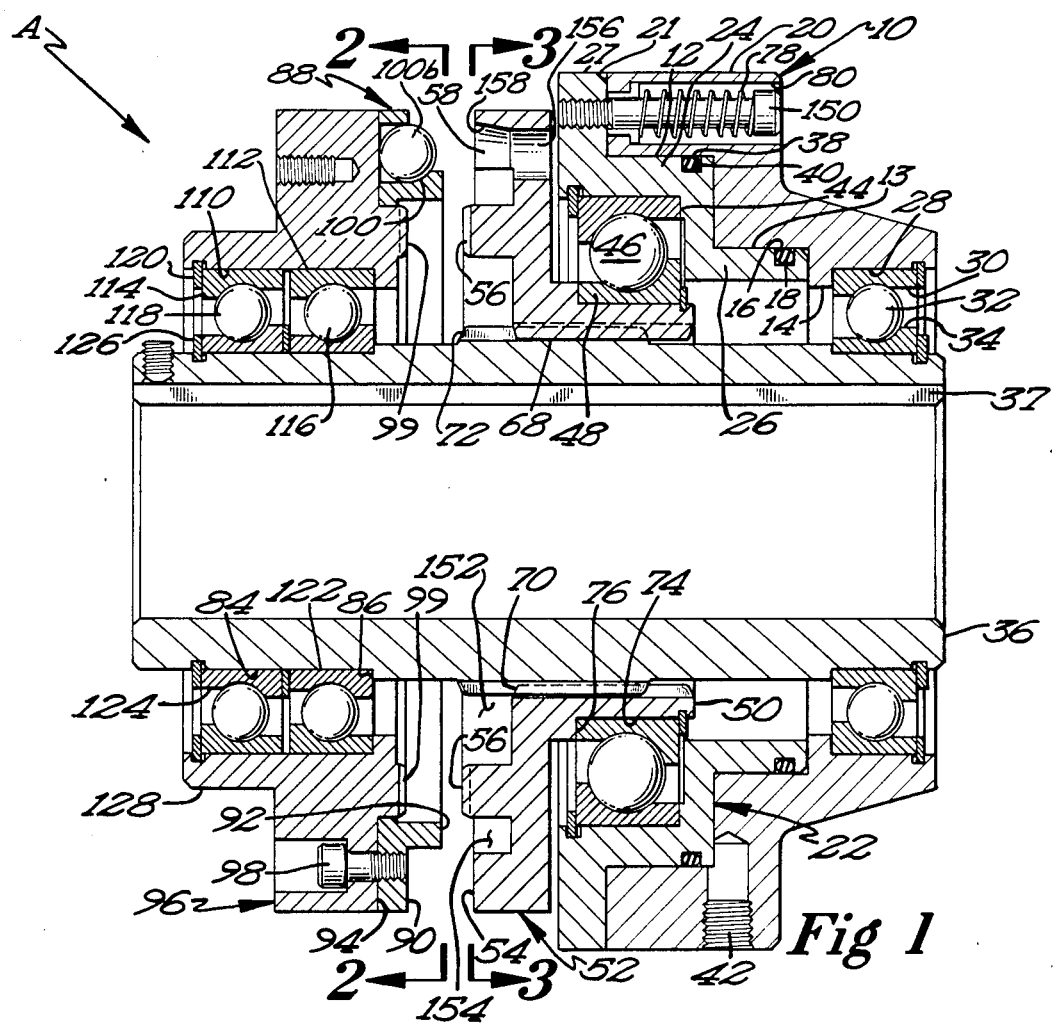
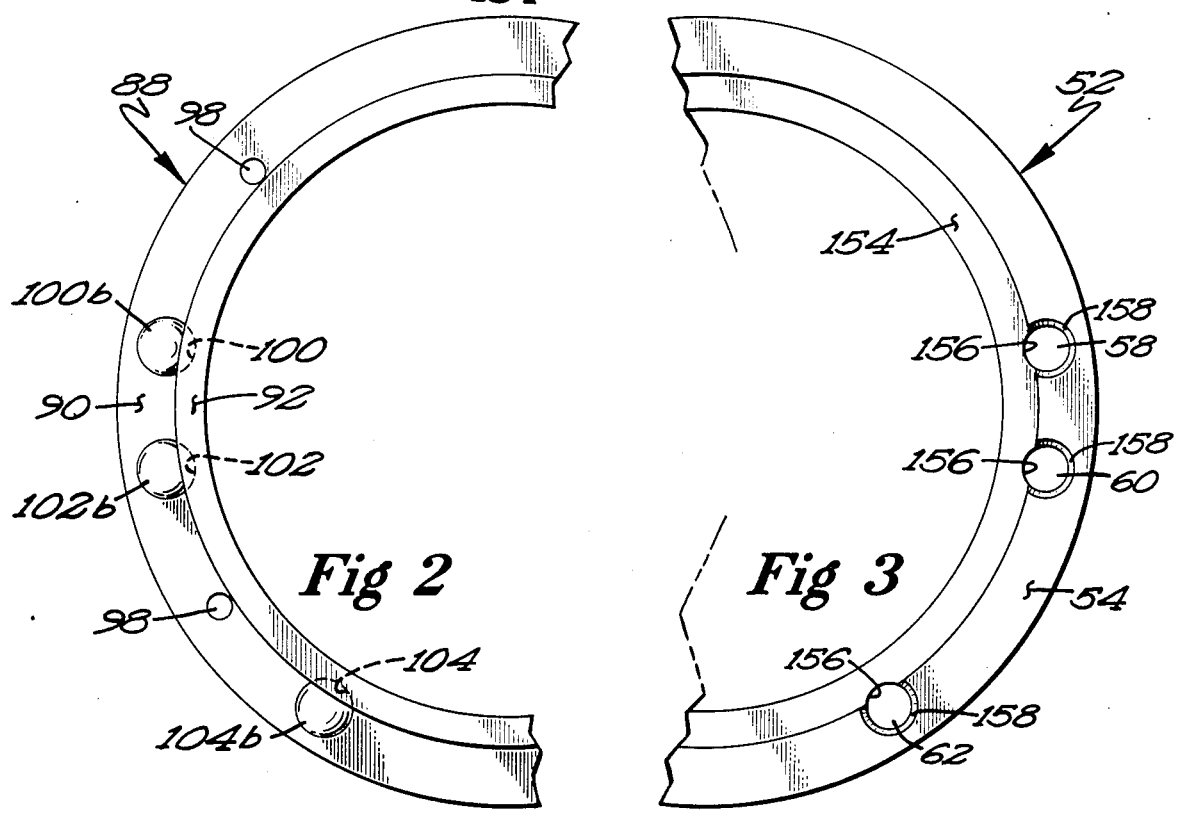

FLUID PRESSURE OPERATED, AXIALLY-ENGAGING CLUTCH

BACKGROUND

This invention relates to improvements in clutches and more particularly to improvements in clutches engageable in driving positions with which the input and output always come to the same degrees of registry for rotation of the output.

In the printing industry, for example, where sheet material must be put through a run a second time and register with a previous sheet position, it is desired to allow a declutched element to be clutched in to the same previous position relative to a member of the machine running the sheet material.

Prior clutches which accomplish this need generally include a ball carrier on the output side of the clutch, the balls of which keep the face of the input drive ring perpendicular to the sliding axis of the hub which provides lateral support between the drive ring and the ball carrier. The balls prevent a torque output during the seeking of registry of the balls of the ball carrier with the cavities of the drive ring. With registry, the teeth of the drive ring engage teeth of this ball carrier output member.

However, such prior clutches may be prone to unwarranted clutch engagement as the result of the balls dislodging from the ball carrier due to wear, clutch failure, and the like and jamming between the input and output interfaces. Such undesired engagement may cause damage to the machinery which the apparatus controls, the work piece which is being operated upon by such machinery, and/or the personnel operating or attempting to repair or maintain such machinery. Thus, a need has arisen for clutches preventing undesired and unwarranted clutch engagement as the result of dislodged balls jamming between the input and the output of the clutch.

SUMMARY

The present invention solves this need and other problems in clutches where the output always comes to the same degrees of registry with the input by providing an improved clutch having safety features for preventing unwarranted engagement of the clutch. In the preferred form of the improved clutch, a first degree of safety is provided by including a unique relationship between the size of the projections of the clutch and the gap between the interface surfaces in an nonengaged position. Specifically, the nonengaged interface gap is larger than the size of the projections for preventing any dislodged projections from jamming between the interface surfaces and resulting in unwarranted engagement of the clutch.

In the preferred form of the improved clutch, another degree of safety is provided by including an improved projection carrier ring. Specifically, the carrier ring includes a flat radial ring portion and an inner axial, annular flange which aids in preventing any dislodged projections from traveling radially inward of the clutch and jamming the interface members causing unwarranted engagement of the clutch and which aids in allowing any dislodged projections to travel outward of the clutch and away from the interface members of the clutch.

It is thus an object of the present invention to provide a novel rotational control apparatus including safety features.

It is thus an object of the present invention to provide a novel rotational control apparatus tending to prevent unwarranted engagement of the rotational control apparatus.

It is thus an object of the present invention to provide a novel clutch including safety features.

It is thus an object of the present invention to provide a novel clutch tending to prevent unwarranted clutch engagement.

It is thus an object of the present invention to provide a novel clutch which prevents jamming of registry projections between the input and the output of the clutch.

It is further an object of the present invention to provide such a novel clutch engageable in driving positions with which the input and output always come to the same degrees of registry for rotation of the output.

It is further an object of the present invention to provide such a novel clutch engageable in a single driving position.

It is further an object of the present invention to provide such a novel clutch which allows dislodged registry projections to travel out of the clutch.

It is thus an object of the present invention to provide such a novel clutch which restricts the passage of dislodged registry projections radially inward into the clutch.

It is further an object of the present invention to provide such a novel clutch having a unique relationship between the size of the registry projections and the spacing between the input and output interfaces.

It is further an object of the present invention to provide such a novel clutch allowing ease of heat treating of the registry projection receiving cavities.

It is further an object of the present invention to provide such a novel clutch having a more rigid formation of the registry projection receiving cavities.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a cross sectional view of a clutch constructed according to the teachings of the present invention.

FIG. 2 shows a partial, side view of a component of the clutch of FIG. 1 according to view line 2—2 of FIG. 1.

FIG. 3 shows a partial, side view of a component of the clutch of FIG. 1 according to the view line 3—3 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "inside", "outside", "axially", "radially", "outward", "inward", and similar terms are used herein, it should be understood that these terms have reference only to the structure shown in the drawings as it would appear to a person viewing the drawings and are utilized only to facilitate describing the invention.

DESCRIPTION

A clutch according to the teachings of the present invention is shown in the drawings and is generally designated A. In the most preferred embodiment of the present invention, clutch A is an improvement of the type shown and described in U.S. Pat. No. 3,760,916. For purpose of explanation of the basic teachings of the present invention, the same numerals designate the same or similar parts in the present figures and the figures of U.S. Pat. No. 3,760,916. The description of the common numerals and the single position fluid operated clutch A may be found herein and in U.S. Pat. No. 3,760,916, which is hereby incorporated herein by reference.

Referring to the drawings in detail, the clutch A includes the stationary cylinder 10 formed with the first internal annular surface 12, the second internal surface 13, and the reduced diameter annular surface 14. The cylinder 10 also includes the annular flange 20 having a free end 21. Further provided is the annular piston 22 formed with the major diameter portion 24 and the reduced diameter portion 26. Piston 24 also includes the radial flange 27 extending from the free end of major diameter portion 24.

Reduced diameter annular surface 14 of cylinder 10 is formed with the annular recess 28 in which is press fit the outer race 30 of the bearing 32. The inner race 34 of the bearing 32 is press fit on the rotatable, input hub 36 formed with the internal keyway 37.

The outer surface of the piston portion 24 is formed with the annular recess 38 in which is positioned the O-ring 40 which makes sealing engagement with annular surface 12 of the cylinder 10. The outer surface of the piston portion 26 is formed with the annular recess 16 in which is positioned the O-ring 18 which makes sealing engagement with annular surface 13 of the cylinder 10.

The numeral 42 designates an inlet which allows fluid pressure to enter the cylinder by conventional means. The outer race 44 of bearing 46 is mounted within the major diameter portion 24 of piston 22 and the inner race 48 is press fit upon the splined sleeve 50 of the circular, input, drive ring 52. The sleeve 50 terminates in the radially disposed annular interface flange 54 on the face of which is formed the rotational interface surface shown in its most preferred form as an annular ring of teeth 56. Formed adjacent but radially inward of the periphery of the annular flange 56 are the five spaced ball-receiving cavities illustrated in the drawings by cavities 58, 60, and 62. In their most preferred form, cavities 58, 60, and 62 are formed by a first bore 156 which extends axially through flange 54 of drive ring 52 and a countersunk type detent 158 having angular sides. Bore 156 has a diameter slightly smaller than the diameter of the projections shown as balls 100b, 102b, and 104b. Detent 158 has a first axially outward, open end having a diameter slightly greater than the diameter of balls 100b, 102b, and 104b and has a second axially inward end terminating in bore 156.

The flange of the drive ring 52 is formed with a central opening 68 which coincides with the inner surface of the sleeve 50, and formed on the inner surface of the flange and the sleeve are the splines 70 which slidably engage with the splines 72 formed on the hub 36 thereby allowing the drive ring to slide axially on the hub. The inner race 48 of the bearing 46 is press fit in the annular recess 74 of the sleeve 50 of the drive ring and the race 48 abuts the shoulder 76 of the drive ring formed by the recess 74. Thus as the piston 22 is moved axially within cylinder 10 by the introduction of fluid pressure through inlet 42, the piston 22 moves the bearing 46 axially which in turn carries with it the drive ring 52 slidably splined upon the hub 36 as described.

The drive ring 52 is urged against axial movement by biasing means shown in the most preferred embodiment as a multiplicity of coil springs 78 mounted in bores 80 formed in the flange 20 at radial locations outside the first internal annular surface 12. Specifically, bolts 150 are provided slidably mounted in flange 20 of cylinder 10 and threadably received in flange 27 of piston 24. The outer ends of the springs 78 abut with the heads of the bolts 150 and the inner ends of the springs 78 abut with the inner ends of the bores 80.

The numeral 88 designates a ball carrier ring formed of the flat radially disposed ring portion 90 terminating in its inner edge in the right angular annular inner flange 92. The ball carrier ring is secured in a recess 94 formed in the annular, output flange mount 96 by means of the bolts 98. Formed on the inner face of the mount 96 is the rotational interface surface shown in its most preferred form as teeth 99 which are in axial alignment with and engageable with the teeth 56 of the drive ring 52. The ball carrier ring 88 has formed in the ring portion 90 and the flange 92 thereof the ball sockets 100, 102, and 104 which are in alignment with the ball cavities 58, 60, and 62 of the drive ring, respectively. The balls 100b, 102b, and 104b are mounted on the flange mount 96 by placing the balls first in the sockets 100–104 of the ring 88 and then ring 88 with balls 100b, 102b, and 104b is secured to the mount 96 thereby mounting the balls on the mount 96. The mount 96 has formed therein the annular recess 110 in which the outer races 112 and 114 of the bearings 116 and 118, respectively, are press fit and held therein by the lock ring 120. The inner races 122 and 124 are press fit in the recess 84 of hub 36 and abut with the shoulder 86 and held in position by the lock ring 126. The flange mount 96 has formed therein the annular recess 128 on which a sheave may be mounted for driving of the same.

The hub 36 is keyed to the shaft of a motor not shown whereby the drive ring 52 is rotated. Fluid pressure is introduced into the inlet 42 thereby causing the piston 24 to move axially and cause the drive ring 52 to also move axially as it rotates whereby the cavities 58–62 seek register with the balls 100b–104b. Generally speaking, with register of the cavities with the balls, the teeth 56 of the drive ring engage and interface with the teeth 99 of the mount 96 whereby the flange mount is rotated. Torque force is not created until full registry of the balls and teeth and once there is engagement all torque is taken by the teeth engagement and not the balls. It will be seen that all five balls are either in or out of engagement and when not in engagement there is planar support for the drive ring. It will be further seen that with the positioning of the balls, there may be always three balls in a triangle containing the axis of the clutch with engagement of portions of the member between the cavities along the path to support the drive ring before engagement of the teeth 56 with teeth 99 and there is negligible torque output during the seeking of the balls by the cavities.

The subtle details of the preferred relationship of cavities 58, 60, and 62, balls 100b, 102b, 104b, and teeth 56 and 99 are set forth and expanded upon in U.S. Pat. No. 3,760,916 which is hereby incorporated herein by reference.

Now that the construction of clutch A according to the teachings of the preferred embodiment of the present invention has been set forth, the improvements of clutch A according to the teachings of the present invention over the clutch disclosed in U.S. Pat. No. 3,760,916 and other subtle features and advantages of the present invention can be set forth and appreciated. Specifically, clutch A according to the teachings of the present invention has a unique relationship between the size of balls 100b, 102b, and 104b with the distance between teeth 56 and 99 of flange 54 and mount 96 when clutch A is fully disengaged. Prior to the present invention, if dislodged from the carrier ring due to wear or failure of any of the clutch components, the dislodged balls could jam between the teeth of the input and the output of the clutch and result in unwarranted engagement of the clutch. According to the teachings of the present invention, the gap between the input and the output, i.e., the distance between teeth 56 and 99 of flange 54 and mount 96, respectively when clutch A is not engaged, is larger than the largest dimension or diameter of balls 100b, 102b, and 104b. Thus, even if the balls should become dislodged from carrier ring 88 and fall between flange 54 and mount 96, balls 100b, 102b, 104b would not jam between teeth 56 and 99 resulting in unwarranted clutch engagement due to their smaller diameter than the gap between teeth 56 and 99. For example, in the preferred embodiment of the present invention, clutch A includes balls 100b, 102b, and 104b having diameters equal to one-half inch and the gap between teeth 56 and 99 is greater than one-half inch and in the range of 9/16 inch.

It should further be appreciated that maintaining the same gap between the input and output interfaces of the clutch disclosed in U.S. Pat. No. 3,760,916 but decreasing the size of the balls results in deficiencies from clutch A according to the teachings of the present invention. Specifically, operation and production problems may arise as the result of making the balls smaller and the reduction of cavity size will further be required.

Furthermore, drive ring 52 of the present invention has an improved construction from the drive ring of U.S. Pat. No. 3,760,916. Specifically, flange 54 of drive ring 52 is formed of an increased thickness allowing concentric annular recesses 152 and 154 to be formed on the face of flange 54 concentric with and on opposite sides of the annular ring of teeth 56. Recess 152 is located radially inward of teeth 56 and provides relief of stresses placed on flange 54 as the result of teeth 56 and their torque force transfer with and between teeth 99. Recess 154 is located radially outward of teeth 56 and provides a complementary mating cavity for receiving flange 92 of ball carrier ring 88 such that flange 92 does not engage with drive ring 52 to prevent registry of balls 100b, 102b, and 104b within cavities 58, 60, and 62 to prevent rotatable engagement of the input and output by teeth 56 and 99.

Furthermore, cavities 58, 60, and 62 of the drive ring 52 of the present invention are formed as detents into flange 56 of drive ring 52 located inwardly of the periphery of the drive ring 52 and not as notches formed in the periphery of the drive ring as shown and disclosed in U.S. Pat. No. 3,760,916. Specifically, the notch or half-moon type cavity of the clutch of U.S. Pat. No. 3,760,916 had problems in closing up or "tulipping" when the drive ring was heat treated. With detent type cavities according to the present invention, a solid ring of material the thickness of the flange 54 is created between the radial extent of cavities 58, 60, and 62 and the periphery of flange 56 resulting in a more rigid formation and is less likely to distort during heat treatment. Thus, the detent type of cavity of the present invention is clearly advantageous over the peripheral, notch type cavity of U.S. Pat. No. 3,760,916.

Additionally, locating the flange 92 at the radially inner edge of portion 90 of ball carrier ring 88 and thus radially inward of clutch A than balls 100b, 102b, and 104b also results in advantageous operation. Specifically, the flange at the radially outward edge of the flat ring portion of the ball carrier ring would tend to hold any dislodged balls within the clutch if they were dislodged from between the flange mount. However, flange 92 at the radially inner edge of portion 90 of ring 88 tends to allow any dislodged balls to travel radially outward and out of clutch A and tends to restrict their passage radially inward and into clutch A and between teeth 56 and 99. Thus, an additional degree of safety is provided for clutch A since unwarranted engagement of clutch A is further prevented as the dislodged balls tend to travel out of the clutch rather than jamming between the input and output as may occur in prior clutches.

Thus, it can be appreciated that undesired engagement of the sheeve as the result of jamming of dislodged balls between the input and output interfaces is prevented with clutch A improved according to the teachings of the present invention. This is especially important in clutches of the type and/or variety of U.S. Pat. No. 3,760,916 where specific rotation positions are desired between hub 36 and the output sheeve. Further, the unexpected and often catastrophic running of machines when the clutch unwarrantedly engages possibly damaging the machines, the work piece in the machine, or body parts of the operator located in the machine controlled by the clutch is prevented.

Further, due to the increased gap between the drive ring 52 and mount 96, the stroke of piston 24 is likewise increased. Due to this longer stroke, springs extending in the gap may become too long and willowy at the length required to bias the piston its full stroke. Thus, mounting the springs 78 in flange 20 of cylinder 10 around bolts 150 allows springs 78 to have large diameters to move the piston 24 in the range of two times the stroke of the piston of U.S Pat. 3,760,916 and provides the necessary support for the springs 78 to prevent them from becoming willowy and to bias the piston 24 its full stroke and with sufficient biasing force in clutch A according to the teachings of the present invention having an increased gap between the input and output interfaces. Furthermore, springs 78 utilized in clutch A according to the present invention may be of a variety which is common to springs utilized in other clutch constructions such as coupling variety type clutches.

Now that the basic teachings of the present invention have been explained, many extensions and variations will be obvious to one having ordinary skill in the art. For example, mount 96 of clutch A according to the teachings of the present invention may include a bearing fail-safe device such as the type as set forth and disclosed in U.S. patent application Ser. No. 693,190 filed Jan. 22, 1985 in the name of James V. Hanks, entitled "Bearing Fail-Safe Device", and assigned commonly with the present case, if desired.

Likewise, although clutch A according to the teachings of the present invention is shown in its most preferred form as being supported by a through shaft and for driving a sheeve, clutch A according to the teachings of the present invention can be of other types and constructions. For example, clutch A according to the teachings of the present invention may be of a coupling variety such as a construction of the type as shown and disclosed in U.S. patent application Ser. No. 06/630,374 filed July 12, 1984 in the name of Leonid Dayen and Charles D. Raines, entitled "Coupling Clutch And A Self-Contained, Non-Removable Guard⇌, and assigned commonly with the present case.

Similarly, although the input and output interfaces of clutch A according to the preferred embodiment of the present invention are shown and described as teeth 56 and 99, it can be realized that other types and constructions of interfaces can be utilized in conjunction with the teachings of the present invention.

Additionally, although the present invention has been shown and described in its most preferred form as being utilized in a clutch of the type and variety of U.S. Pat. No. 3,760,916, it can be appreciated that the teachings of the present invention may be utilized in other types and constructions of rotational control apparatus after they become known by persons skilled in the art. For example, although balls 100b, 102b, and 104b of the registry type clutch are more prone to dislodge resulting in unwarranted clutch engagement, the teachings of the present invention may be utilized to provide a unique relationship between the distance or gap between the interface members of the rotational control apparatus and the longest dimension of the part or component of the rotational control apparatus most likely to dislodge and jam in the interface members of the rotational control apparatus resulting in unwarranted engagement of the rotational control apparatus.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Clutch comprising, in combination: an input having a first interface surface; an output having a second interface surface; with at least the first interface surface being slidably mounted from a first interface position where the first and second interface surfaces are spaced by a distance and a second interface position where the first and second interface surfaces are rotatably engaged; means for moving the first interface surface between its first and second interface positions for selectively interrelating the input and output for allowing the input and the output to be rotatably related and for allowing the input and the output to be rotatably independent; with one of the input and the output including a multiplicity of projection-receiving cavities; with the other of the input and the output including a projection carrier ring having a multiplicity of projections for engagement with the cavities, with the cavities and projections arranged so that at least in a first registry position the projections overlie the cavities allowing the interface surfaces to rotatably relate the input with the output and when the projections and cavities are not in the first registry position the interface surfaces are prevented from rotatably relating the input with the output; wherein the projection carrier ring comprises, in combination: a flat, radially disposed ring portion terminating in its inner edge in a right angular annular inner flange; and projection receiving sockets for capturing the projections, with the right angular annular inner flange located radially inward of the projections tending to allow any dislodged projections to travel radially outward of the clutch and tending to prevent the dislodged projection from traveling radially inward of the clutch and between the interface surfaces of the clutch and jamming between the interface surfaces causing unwarranted engagement of the input and the output; and wherein the distance between the first and second interface surfaces in the first interface position is larger than the projections for aiding in preventing any dislodged projection from jamming between the first and second interface surfaces and causing unwarranted engagement of the input and the output of the clutch.

2. The clutch of claim 1 wherein the interface moving means comprises, in combination: a cylinder having a first internal annular surface, a second internal annular surface, and a third internal annular surface; a piston comprising, in combination: a major diameter portion having a size and shape for reciprocal receipt within the first internal annular surface of the cylinder, a reduced diameter portion having a size and shape for reciprocal receipt within the second internal annular surface of the cylinder, and a radial flange having a diameter greater than the major diameter portion and extending from the major diameter portion; with the piston being axially related to the first interface surface; means for introducing fluid pressure on a first side of the piston for moving the piston in a first axial direction; means for biasing the piston in a direction opposite to the first axial direction comprising, in combination: axially extending bores formed in the cylinder at a radial location outside the first internal annular surface and having axially inward ends, a plurality of bolts located within the bores, with the bolts having heads and extending through the cylinder and threadably received in the radial flange of the piston, and springs located on the bolts and extending between the head of the bolts and the axially inward ends of the bores; wherein the input is a hub; and wherein the clutch further comprises, in combination: means for rotatably mounting the cylinder to the input hub comprising a bearing located between the input hub and the third internal annular surface of the cylinder.

3. The clutch of claim 2 further comprising, in combination: an annular interface flange, with the annular interface flange including the projection receiving cavities and one of the first and second interface surfaces, wherein the annular interface flange has a periphery having a diameter greater than the radial extent of the projection receiving cavities, and wherein the projection receiving cavities are located radially inward of the periphery of the annular interface flange forming a solid ring of material between the radial extent of the projection receiving cavities and the periphery of the annular interface flange to allow the annular interface flange to be more rigid and less likely to distort during heat treatment; and wherein the annular interface flange further comprises, in combination: an annular cavity for receiving the right angular annular inner flange of the projection carrier ring when the first and second interface surfaces are rotatably engaged.

4. Clutch comprising, in combination: an input; an output; interface means formed on the input and output for selectively interrelating the input and output for allowing the input and the output to be rotatably related and for allowing the input and the output to be rotatably independent; with one of the input and the output including a multiplicity of projection-receiving cavities; with the other of the input and the output including a projection carrier ring having a multiplicity of projections for engagement with the cavities, with the cavities and projections arranged so that at least in a first registry position the projections overlie the cavities allowing the interface means to rotatably relate the input with the output and when the projections and cavities are not in the first registry position the interface means is prevented from rotatably relating the input with the output; wherein the projection carrier ring comprises, in combination: a flat, radially disposed ring portion terminating in its inner edge in a right angular annular inner flange; and projection receiving sockets for capturing the projections, with the right angular annular inner flange located radially inward of the projections tending to allow any dislodged projections to travel radially outward of the clutch and tending to prevent the dislodged projection from traveling radially inward of the clutch and into the interface means of the clutch and jamming in the interface means causing unwarranted engagement of the input and the output of the clutch.

5. The clutch of claim 4 wherein the interface means comprises, in combination: a first interface surface formed on one of the input and the output and a second interface surface formed on the other of the input and the output; with at least the first interface surface being slidably mounted from a first interface position where the first and second interface surfaces are spaced by a distance and a second interface position where the first and second interface surfaces are rotatably engaged; and means for moving the first interface surface between its first and second interface positions; wherein the distance between the first and second interface surfaces in the first interface position is larger than the projections for aiding in the prevention of any dislodged projection from jamming between the first and second interface surfaces and causing unwarranted engagement of the input and the output of the clutch.

6. The clutch of claim 5 wherein the first and second interface surfaces are teeth; and wherein the projections are balls having a diameter:

7. The clutch of claim 5 wherein the interface moving means comprises, in combination: a cylinder; a piston; with the piston being reciprocally mounted with respect to the cylinder and axially related to the first interface surface; means for introducing fluid pressure on a first side of the piston for moving the piston in a first axial direction; means for biasing the piston in a direction opposite to the first axial direction comprising, in combination: a plurality of bolts having heads and extending through one of the cylinder and the piston and threadably received in the other of the cylinder and the piston; and springs located on the bolts and extending between the nead of the bolts and the cylinder or piston through which the bolts extend.

8. The clutch of claim 7 wherein the cylinder includes a first internal annular surface and a second internal annular surface; wherein the piston comprises, in combination: a major diameter portion having a size and shape for reciprocal receipt within the first internal annular surface of the cylinder, a reduced diameter portion having a size and shape for reciprocal receipt within the second internal annular surface of the cylinder, and a radial flange having a diameter greater than the major diameter portion and extending from the major diameter portion; wherein the bolts of the biasing means extend through the cylinder at a radial location outside the first internal annular surface and are threadably received within the radial flange of the piston.

9. The clutch of claim 8 further comprising, in combination: axially extending bores formed in the cylinder and having axially inward ends, with the bolts of the biasing means located within the bores, and with the springs extending between the heads of the bolts and the axially inward ends of the bores.

10. The clutch of claim 8 wherein the input is a hub; and wherein the cylinder further comprises, in combination: a third internal annular surface; and wherein the clutch further comprises, in combination: means for rotatably mounting the cylinder to the input hub comprising a bearing located between the input hub and the third internal annular surface of the cylinder.

11. The clutch of claim 5 further comprising, in combination: an annular interface flange, with the annular interface flange including the projection receiving cavities and the first interface surface, wherein the annular interface flange has a periphery having a diameter greater than the radial extent of the projection receiving cavities, and wherein the projection receiving cavities are located radially inward of the periphery of the annular interface flange forming a solid ring of material between the radial extent of the projection receiving cavities and the periphery of the annular interface flange to allow the annular interface flange to be more rigid and less likely to distort during heat treatment.

12. The clutch of claim 11 wherein the annular interface flange further comprises, in combination: an annular cavity for receiving the right angular annular inner flange of the projection carrier ring when the first and second interface surfaces are rotatably engaged.

13. Clutch comprising, in combination: an input having a first interface surface; an output having a second interface surface; with at least the first interface surface being slidably mounted from a first interface position where the first and second interface surfaces are spaced by a distance and a second interface position where the first and second interface surfaces are rotatably engaged; means for moving the first interface surface between its first and second interface positions for selectively interrelating the input and output for allowing the input and the output to be rotatably related and for allowing the input and the output to be rotatably independent; with one of the input and the output including a multiplicity of projection-receiving cavities; with the other of the input and the output including a multiplicity of projections for engagement with the cavities, with the cavities and projections arranged so that at least in a first registry position the projections overlie the cavities allowing the interface surfaces to rotatably relate the input with the output and when the projections and cavities are not in the first registry position the interface surfaces are prevented from rotatably relating the input with the output; and wherein distance between the first and second interface surfaces in the first interface position is larger than the projections for tending to prevent any dislodged projection from jamming between the first and second interface surfaces and casuing unwarranted engagement of the input and the output.

14. The clutch of claim 1 wherein the multiplicity of projections are mounted to the other of the input and the output by a projection carrier ring; and wherein the projection carrier ring comprises, in combination: a flat, radially disposed ring portion terminating in its inner edge in a right angular annular inner flange, and projection receiving sockets for capturing the projections, with the right angular annular inner flange located radially inward of the projections tending to alloy any dislodged projections to travel radially outward of the clutch and aiding to prevent the dislodged projection from traveling radially inward of the clutch and between the first and second interface surfaces of the clutch and jamming between the first and second interface surfaces causing unwarranted engagement of the input and the output of the clutch.

15. The clutch of claim 14 further comprising, in combination: an annular interface flange, with the annular interface flange including the projection receiving cavities and one of the first and second interface surfaces, wherein the annular interface flange has a periphery having a diameter greater than the radial extent of the projection receiving cavities, and wherein the projection receiving cavities are located radially inward of the periphery of the annular interface flange forming a solid ring of material between the radial extent of the projection receiving cavities and the periphery of the annular interface flange to allow the annular interface flange to be more rigid and less likely to distort during heat treatment; and wherein the annular interface flange further comprises, in combination: an annular cavity for receiving the right angular annular inner flange of the projection carrier ring when the first and second interface surfaces are rotatably engaged.

16. The clutch of claim 13 wherein the first and second interface surfaces are teeth; and wherein the projections are balls having a diameter.

17. The clutch of claim 13 wherein the interface moving means comprises, in combinations: a cylinder; a piston; with the piston being reciprocally mounted with respect to the cylinder and axially related to the first interface surface; means for introducing fluid pressure on a first side of the piston for moving the piston in a first axial direction; means for biasing the piston in a direction opposite to the first axial direction comprising, in combination: a plurality of bolts having heads and extending through one of the cylinder and the piston and threadably received in the other of the cylinder and the piston; and springs located on the bolts and extending between the head of the bolts and the cylinder or piston through which the bolts extend.

18. The clutch of claim 17 wherein the cylinder includes a first internal annular surface and a second internal annular surface; wherein the clutch further comprises, in combination: axially extending bores formed in the cylinder and having axially inward ends; wherein the piston comprises, in combination: a major diameter portion having a size and shape for reciprocal receipt within the first internal annular surface of the cylinder, a reduced diameter portion having a size and shape for reciprocal receipt within the second internal annular surface of the cylinder, and a radial flange having a diameter greater than the major diameter portion and extending from the major diameter portion; wherein the bolts of the biasing means are located within the bores and extend through the cylinder at a radial location outside the first internal annular surface of the cylinder and are threadably received within the radial flange of the piston and with the springs extending between the heads of the bolts and the axially inward ends of the bores.

19. The clutch of claim 18 wherein the input is a hub; and wherein the cylinder further comprises, in combination: a third internal annular surface; and wherein the clutch further comprises, in combination: means for rotatably mounting the cylinder to the input hub comprising a bearing located between the input hub and the third internal annular surface of the cylinder.

20. Rotational control apparatus comprising, in combination: an input having a first interface surface; an output having a second interface surface; with at least the first interface surface being slidably mounted from a first interface position where the first and second interface surfaces are spaced by a distance and a second interface position where the first and second interface surfaces are rotatably engaged; means for moving the first interface surface between its first and second interface positions for selectively interrelating the input and output for allowing the input and the output to be rotatably related and for allowing the input and the output to be rotatably independent; and wherein the distance between the first and second interface surfaces in the first interface position is larger than the part of the rotational control apparatus most likely to dislodge from the rotational control apparatus and jam between the first and second interface surfaces for tending to prevent unwarranted engagement of the input and the output of the rotational control apparatus.

21. The rotational control apparatus of claim 20 wherein one of the input and the output includes a multiplicity of projection-receiving cavities; with the other of the input and the output including a multiplicity of projections for engagement with the cavities, with the cavities and projections arranged so that at least in a first registry position the projections overlie the cavities allowing the interface surfaces to rotatably relate the input with the output and when the projections and cavities are not in the first registry position the interface surfaces are prevented from rotatably relating the input with the output of the rotational control apparatus, and wherein the projections are the part of the rotational control apparatus that is most likely to dislodge from the rotational control apparatus.

* * * * *

UNITED STATES PATENT OFFICE
CERTIFICATE OF CORRECTION

Patent No. 4,624,356                    Dated November 25, 1986

Inventor(s)  James V. Hanks and Charles D. Raines

It is certified that error appears in the above-identified patent and that said Letters Patent are hereby corrected as shown below:

Column 5, line 8, cancel "104b;" and substitute therefor --and 104b--.

Column 7, line 20, cancel "⇌" and substitute therefor --"--.

Column 10, line 1, cancel "nead" and substitute therefor --head--.

Column 11, line 16, cancel "alloy" and substitute therefor --allow--.

Signed and Sealed this
Seventeenth Day of February, 1987

Attest:

DONALD J. QUIGG

Attesting Officer           Commissioner of Patents and Trademarks